United States Patent [19]
Hu et al.

[11] Patent Number: 6,156,874
[45] Date of Patent: Dec. 5, 2000

[54] MULTIDIMENSIONALLY CROSSLINKABLE RIGID-ROD BENZOBISAZOLE POLYMER FIBERS

[75] Inventors: Xiaodong Hu, Alpharetta; Satish Kumar, Lawrenceville; Malcolm B. Polk, Decatur, all of Ga.

[73] Assignee: Georgia Tech Research Corp., Atlanta, Ga.

[21] Appl. No.: 09/238,533

[22] Filed: Jan. 27, 1999

Related U.S. Application Data

[60] Provisional application No. 60/072,662, Jan. 27, 1998.

[51] Int. Cl.$^7$ .................................................... C08G 73/00
[52] U.S. Cl. ......................... 528/422; 528/486; 528/487; 528/502 R; 528/503; 528/183; 528/186; 528/337; 528/339; 528/342
[58] Field of Search ..................................... 528/422, 486, 528/487, 502 R, 503, 183, 186, 337, 339, 342

[56] References Cited

U.S. PATENT DOCUMENTS

| | | |
|---|---|---|
| 5,001,217 | 3/1991 | Tsai . |
| 5,098,988 | 3/1992 | Tsai . |
| 5,100,434 | 3/1992 | Sweeny . |
| 5,128,443 | 7/1992 | Arnold . |
| 5,200,495 | 4/1993 | Arnold . |
| 5,633,337 | 5/1997 | Tan . |

OTHER PUBLICATIONS

Dang et al., ACS Polymer Preprints, vol. 36, No. 1, pp. 455–456 (1995).

*Primary Examiner*—Duc Truong
*Attorney, Agent, or Firm*—Todd Deveau; Troutman Sanders LLP

[57] ABSTRACT

Rod-like aromatic heterocyclic polymers having repeating units of the formula —(—Q—Ar—)$_m$—(—Q—Ph—)$_n$— where Q is

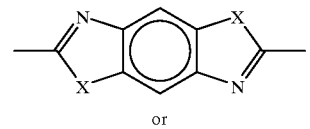

or

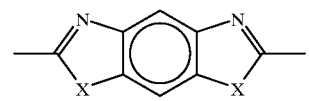

X is —O—, —S—, or —NH—; m is 0.05 to 1.0; n is 1.0-m; Ph is 1,4-phenylene; Ar is

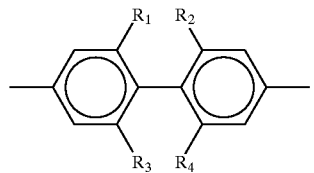

R$_1$ and R$_2$ are the same and are either H or CH$_3$; and R$_3$ and R$_4$ are CH$_3$.

13 Claims, No Drawings

MULTIDIMENSIONALLY CROSSLINKABLE RIGID-ROD BENZOBISAZOLE POLYMER FIBERS

STATEMENT OF RELATED APPLICATIONS

This application claims priority on pending U.S. Provisional Patent Application Ser. No. 60/072,662, filed on Jan. 27, 1998.

BACKGROUND OF THE INVENTION

1. Technical Field

The present invention relates generally to the field of rigid-rod polymer analogs and specifically to the field of multidimensionally crosslinkable benzobisazole polymers and processes for making such polymers.

2. Prior Art

The rigid-rod aromatic heterocyclic polymers are well known for their outstanding mechanical and thermal properties. These polymers can be processed into fibers or films with high tensile strengths and moduli, but they have relatively low fiber axial compressive properties compared to carbon fiber and inorganic fibers. The characteristically low compressive properties limit their potential applications in certain structural composites.

Molecular crosslinking has been attempted to enhance the compressive properties of rigid-rod polymer fibers. Several crosslinkable rigid-rod polymer systems, such as methyl pendent rigid-rod polymers (Tsai et al, U.S. Pat. No. 5,001, 217), halogenated rigid-rod polymers (Sweeny, U.S. Pat. No. 5,100,434) and benzocyclobutene rigid-rod polymers (see Dang et al, ACS Polymer Preprints, Vol. 36, No. 1, pp. 445–456, 1995), have been accordingly designed to enhance the fiber compressive properties. Improvements in fiber compressive properties are apparent in certain systems as the degree of crosslinking increases.

BRIEF DESCRIPTION OF THE INVENTION

Multidimensionally crosslinkable benzobisazole polymers, a rigid-rod analog, are prepared by polycondensation of amino hydrochloride monomers with methyl ortho-substituted biphenyl dicarboxylic acid or its derivatives and terephthalic acid or terephthaloyl chloride in polyphosphoric acid. High molecular weights of the polymers can be produced. Concentrated polymer solutions in polyphosphoric acid can be processed into fibers, which can be heat treated to induce a crosslinking reaction resulting in a crosslinked polymer fiber or film with improved compressive strength due to multidimensional crosslinking. The fibers or films produced from the polymer have high performance characteristics with extremely high tensile strength and modulus. The heat treated fibers can be used as reinforcement materials in structural composites.

In accordance with the present invention, there are provided rigid-rod aromatic heterocyclic polymers having repeating units of the following formula:

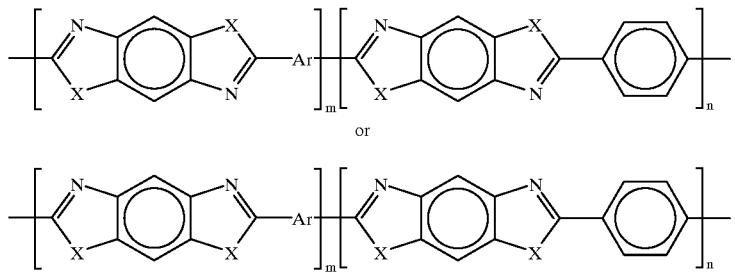

or wherein X is selected from the group consisting of —O—, —S—, and —NH—; m and n are positive real numbers, each representing the fraction that the respective different recurring units are present in said repeating unit; m is 0.05 to 1.0; n is 1.0-m; Ph is 1,4-phenylene; and Ar is

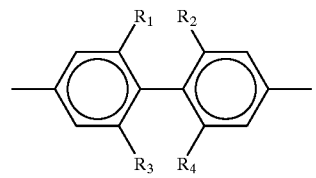

wherein $R_1=R_2=R_3=R_4=C_{1-3}$ alkyl; or $R_1$ and $R_2$ can be the same or different and are selected from the group consisting of $C_{1-3}$ alkyls and H; and $R_3$ and $R_4$ can be the same or different and are selected from the group consisting of $C_{1-3}$ alkyls. The $C_{1-3}$ alkyl is preferably $CH_3$; and m is preferably 0.1 to 0.3, and most preferably about 0.25.

This invention also provides methods for processing the aforementioned polymers into fibers and for preparing crosslinked polymeric fibers of improved compressive strength, as described hereinafter.

It is an object of the present invention to provide novel multidimensionally crosslinkable rigid-rod aromatic heterocyclic polymers and fibers which exhibit improved compressive properties after heat treatment.

It is another object of the present invention to provide methods for preparing these multidimensionally crosslinkable rigid-rod aromatic heterocyclic polymers and fibers.

Other objects, aspects, and advantages of the present invention will be apparent to those skilled in the art from a reading of the following detailed disclosure of the invention.

DETAILED DESCRIPTION OF THE PREFERRED EMBODIMENT

The polymers of this invention are prepared by the polycondensation of 4,6-diaminoresorcinol dihydrochloride, 2,5-diaminohydroquinone dihydrochloride, 4,6-diamino-1, 3-benzenedithiol dihydrochloride, 2,5-diamino-1,4-benzenedithiuol dihydrochloride or 1,2,4,5-tetraaminobenzene tetrahydrochloride; an ortho-substituted biphenyl-4,4'-dicarboxylic acid or acid halide derivative of the formula ROC—Ar—COR, wherein R is OH or Cl, and Ar is as described previously; and a terephthalate. The polymers may be prepared by:

a. mixing an amino hydrochloride monomer with a polyphosphoric acid (PPA) having a phosphorous pentoxide concentration of about 77 to 85% and preferably below 80% at room temperature for about 24 hours.

b. heating the resulting mixture to about 60–80° C. for about 24 hours in an inert gas atmosphere such as nitrogen and argon. Reduced pressure is optionally used to facilitate removal of the hydrogen chloride in the final several hours.

c. adding the substituted biphenyl dicarboxylic acid or acid chloride monomer to the mixture resulting from step b to provide a mixture of amino monomer and acid monomer in the preliminary solvent.

d. increasing the phosphorous pentoxide content of the mixture resulting from step c to provide a reaction medium in which the percentage of phosphorous pentoxide should be about 82 to 85% and preferably about 83% by weight at the end of the polymerization.

e. placing the reaction medium resulting from step d at a temperature of about 110 to 200° C. for about 24 to 48 hours. Preferably, the reaction temperature is increased gradually during the polymerization period, e.g., 130° C. for 5 hours, then 160° C. for 18 hours, and finally 190° C. for 24 hours.

Alternatively, steps a, b, and c may be combined by adding the amino hydrochloride and substituted biphenyl diacid or acid chloride monomers to a PPA with 85% $P_2O_5$, then removing hydrogen chloride. After dehydrochlorination of the amino hydrochloride monomer the polymerization is carried out.

Step c may be modified by adding a solution of the substituted biphenyl dicarboxylic acid or acid chloride monomers in aromatic hydrocarbons such as benzene and toluene to the mixture resulting from step b, and then heating the mixture to a temperature of about 50–80° C. for several hours. The reduced pressure is used to remove the aromatic hydrocarbon. The initial polymerization is therefore carried out on the interfaces between polyphosphoric acid and the aromatic hydrocarbon. The application of interfacial reaction at the beginning may lead to a highly homogenous polymer solution at the end of the polymerization suitable for subsequent fiber spinning.

At the end of the reaction period, the polymer solution is in a very viscous or semisolid state. The polymer may be precipitated from the solution by pouring the reaction mixture into water. The precipitated polymer is initiated treated with ammonium hydroxide, then washed with water until all PPA is removed. The polymer is dried under reduced pressure.

The polymers of this invention are soluble in strong acids, such as methanesulfonic acid (MSA) and chlorosulfonic acid (CSA). The molecular weight of these polymers is commonly indicated by intrinsic viscosity of the polymer. The intrinsic viscosity is determined in MSA or CSA at 30° C.

The polymers produced in accordance with the invention may be used to produce fibers and films. In order to process these polymers into fibers or films, solutions are prepared containing about 5 to about 15, preferably about 8 to 12, weight percent of the copolymer in PPA. Such solutions may be spun or extruded into a coagulation bath of water.

The fibers of this invention can be crosslinked by exposure to an elevated temperature or by exposure to suitable radiation. Crosslinking by exposure to heat may be accomplished by exposing the fibers to a temperature of about 450–550° C. for about 0.5 to 30 minutes under an inert atmosphere of nitrogen or argon. The crosslinked fibers are insoluble in all strong acid solvents. Evidence of crosslinking is established by $^{13}C$ solid state nuclear magnetic resonance spectroscopy. $^{13}C$ NMR spectra of heat-treated fibers indicate that the intensity of pendent groups (for example methyl groups) at about 20 ppm decreases at the temperatures of 500–550° C., and in the meantime a new peak at 38 ppm emerges and its intensity increases with the temperature of heat-treatment. The crosslinked fibers in accordance with the present invention exhibit improved compressive strength.

The following examples illustrate the invention:

EXAMPLE I

Into the bottom of a 250-ml three-neck flask equipped with a mechanical stirrer, nitrogen inlet and outlet, was placed 0.996 g (4.061 mmol) of 2,5-diamino-1,4-benzenedithiol dihydrochloride and 22.45 g of PPA (83% $P_2O_5$). The mixture was stirred at room temperature under a stream of nitrogen for 24 hours and then at 80° C. for another 24 hours (including 1 hour under reduced pressure). To the resulting clear solution was added 1.221 g (4.061 mmol) of 2,2'6,6'-tetramethylbiphenyl-4,4'-dicarboxylic acid and 2.5 g $P_2O_5$. The temperature was maintained at 80° C. for 5 hours and then raised to 110° C. for 1 hour, to 130° C. for 5 hours, 160° C. for 18 hours, 190° C. for 24 hours, and 200° C. for 6 hours. As the temperature increased, stir opalescence began to occur at about 160° C. The viscous solution was poured into water. The precipitated polymer was collected by filtration, washed thoroughly with dilute ammonium hydroxide aqueous solution, hot water, and finally dried in vacuum at 85° C. for 20 h. The yield was 1.54 (95%). The polymer was a bright brown color and was soluble in chlorosulfonic acid. The intrinsic viscosity was 9.17 dl/g in chlorosulfonic acid at 30° C. Analysis: Calculated for $C_{24}H_{18}N_2S_2$: C, 72.35; H, 4.56; N, 7.04; S, 16.06. Found: C, 71.50; H, 4.50; N, 6.84; S, 15.44.

EXAMPLE II

Into the bottom of a 250-ml three-neck flask equipped with a mechanical stirrer, nitrogen inlet and outlet, was placed 0.8000 g (3.2628 mmol) of 2,5-diamino-1,4-benzenedithiol dihydrochloride and 10 g of PPA with 85% of $P_2O_5$. The mixture was stirred at room temperature under a nitrogen stream for 24 hours and then at 80° C. for another 24 hours (including 1 hour under reduced pressure), which resulted in a clear solution. To such a yellow solution was added 1.0938 g (3.2628 mmol) of 2,2',6,6'-tetramethylbiphenyl-4,4'-dicarbonyl chloride under a nitrogen stream, and the mixture was maintained at 80° C. for 0.5 hour and heated to 120° C. for 1 hour, 140° C. for 3 hours, 160° C. for 12 hours, and 180° C. for 24 hours. As the temperature increased, stir opalescence began to occur at about 140° C. The solution was poured into water, washed with ammonium hydroxide, and dried under reduced pressure at 100° C. The yield was 1.26 g (97%). The intrinsic viscosity in MSA was 19.5 dl/g. Analysis: Calculated for $C_{24}H_{18}N_2S_2$: C, 72.35; H, 4.56; N, 7.04; S, 16.06. Found: C, 72.07; H, 4.69; N, 7.03; S, 15.92.

EXAMPLE III

Into the bottom of a resin flask equipped with a mechanical stirrer and nitrogen inlet and outlet, was placed 1.000 g (4.08 mmol) of 2,5-diamino-1,4-benzenedithiol dihydrochloride and 18.0 g of PPA (85% $P_2O_5$). The mixture was slowly heated to 80° C., and the temperature was maintained at 80° C. for 24 hours. To the resulting yellow solution, 0.339 g (2.04 mmol) of terephthalic acid and 0.608 g (2.04 mmol) of 2,2',6,6'-tetramethylbiphenyl-4,4'-dicarboxylic acid were added. The mixture was heated under a nitrogen atmosphere at 80° C. for 3 hours, 110° C. for 1 hour, 130° C. for 5 hours, 160° C. for 18 hours, and 190° C. for 24 hours. The copolymer was precipitated in water, collected by suction filtration, washed thoroughly with dilute ammonium hydroxide and water for removal of PPA, and dried under reduced pressure at 100° C. overnight. Intrinsic viscosity in CSA at 30° C. was 8.3 dl/g.

EXAMPLE IV

Into the bottom of a resin flask equipped with a mechanical stirrer, nitrogen inlet and outlet, was placed 1.000 g (4.08 mmol) of 2,5-diamino-1,4-benzenedithiol dihydrochloride, 0.414 g (2.04 mmol) of terephthaloyl chloride, 0.684 g (2.04 mmol) of 2,2'6,6'-tetramethylbiphenyl-4,4'-dicarbonyl chloride and 6.0 g of PPA (77% $P_2O_5$). The reaction mixture was heated under a nitrogen atmosphere to 65° C. for 24 hours. To the resulting mixture, 2.1 g $P_2O_5$ was added to bring the polymer concentration to 15 percent. The mixture was heated under a nitrogen atmosphere to 110° C. for 2 hours, 140° C. for 5 hours, 160° C. for 24 hours, and 180° C. for 5 hours. Stir opalescence began to occur at 140° C. The copolymer was precipitated in water, collected by suction filtration, washed thoroughly with dilute ammonium hydroxide and water, and dried under vacuum at 85° C. for 30 hours. The product (1.35 g) was obtained in 99.5% yield. Intrinsic viscosity in methanesulfonic acid at 30° C. was 16.3 dl/g. Analysis calculated for $C_{19}H_{12}N_2S_2$: C, 68.65; H, 3.64; N, 8.43; S, 19.29. Found: C, 68.21; H, 3.92; N, 8.44; S, 19.26.

EXAMPLE V

Into the bottom of a resin flask equipped with a mechanical stirrer, nitrogen inlet and outlet, was placed 5.031 g (20.52 mmol) of 2,5-diamino-1,4-benzenedithiol dihydrochloride, 1.041 g (5.13 mmol) of terephthaloyl chloride, 5.160 g (15.39 mmol) of 2,2'6,6'-tetramethylbiphenyl-4,4-dicarbonyl chloride and 31.4 g of PPA (77% $P_2O_5$). The mixture was heated under a nitrogen atmosphere to 65° C., and maintained at 65° C. for 48 hours. $P_2O_5$ (7.7 g) $P_2O_5$ was added to bring the PPA concentration to 83%. The reaction mixture was heated to 80° C. for 1 hour, 110° C. for 5 hours, 140° C. for 20 hours, and 165° C. for 9 hours. The copolymer was precipitated in water, collected by suction filtration, washed thoroughly with dilute ammonium hydroxide and water, and dried under vacuum at 85° C. for 24 hours. Intrinsic viscosity in methanesulfonic acid at 30° C. was 12.7 dl/g. Analysis calculated for $[C_{14}H_6N_2S_2]_{0.25}[C_{24}H_{18}N_2S_2]_{0.75}$: C, 70.65; H, 4.14; N, 7.67; S, 17.54. Found: C, 68.98; H, 4.29; N, 7.44; S, 17.24.

EXAMPLE VI

The same procedure was used as described in Example II except for the addition of the designated amount of terephthaloyl chloride and tetramethylbiphenyl dicarbonyl chloride. The yellow solution of dehydrochlorinated 2,5-diamino-1,4-benzenedithiol dihydrochloride (4.0945 g, 16.70 mmol) in 40 of PPA with 8.3% of $P_2O_5$ was allowed to cool to 50° C. To the solution was added 1.3996 g (4.170 mmol) of 2,2'6,6'tetramethylbiphenyl-4,4'-dicarbonyl chloride in 10 g benzene, and the mixture was maintained at 50° C. for 3 hours under stirring. The benzene was removed cautiously under reduced pressure. The temperature was raised to 80° C., and 2.5428 g (12.53 mmol) of terephthaloyl chloride was added to the flask. After 3 hours at this temperature, the mixture was heated to 110° C. for 12 hours, 140° C. for 24 hours and 165° C. for 10 hours. A small portion of the reaction solution was added to water, washed and dried in vacuo overnight at 100° C. for use in measurement of the intrinsic viscosity ([η]=14.0 dL/g in methanesulfonic acid at 30° C.) The remaining solution was bottled for use in fiber spinning. Analysis calculated for $[C_{14}H_6N_2S]_{0.75}$ $[C_{24}H_{18}N_2S_2]_{0.25}$: C, 66.19; H, 3.03; N, 9.36; S, 21.42. Found: C, 65.73; H, 3.13; N, 8.96; S, 20.22.

Fibers from the above examples were spun at 110° C., using a 500-mm diameter spinneret, into water passing through a 15-cm long air gap. The single filaments were wound on 15-cm diameter plastic spools at 100 cm/minute using a 4–12 spin-draw ratio. The fiber was washed by immersing it in running water for several days to remove residual PPA and then air dried. In a free annealing heat treatment, 5-cm long fibers were put in a small quartz tube, and heat-treated in a preheated tube furnace from 450–550° C. in a nitrogen stream for 10 minutes. The tension annealing of fibers was done in a 100-cm long ceramic tubular furnace. The fiber was put in the furnace at room temperature and heated up to 450–550° C. An 11.1 grams load (about 25 MPa tension) was used by hanging a weight at one end of the fiber. The heat treatment under tension was carried out in batches of about 100-cm lengths. Only the 30-cm middle sections of the heat-treated fibers were selected for study. The results for a heat-treated poly[tetramethylbiphenyl benzobisthiazole/co-(phenylene benzobisthiazole) copolymer fiber are shown in Table 1.

TABLE 1

| | Tensile Properties of Tetramethylbiphenyl PBZT/PBZT (25/75) Polymer Fiber | | | | |
|---|---|---|---|---|---|
| Fiber | Tensile Str. (GPa) | Modulus (GPa) | Elong. to break (%) | RCS[a] (GPa) | RCS/Tensile Str. |
| As-spun | 1.22 ± 0.02 | 19.7 ± 0.6 | 5.9 ± 0.2 | 0.57 | 0.47 |
| 500f[b] | 1.35 ± 0.12 | 54.7 ± 1.9 | 3.2 ± 0.1 | 0.45 | 0.33 |
| 500f | 0.64 ± 0.01 | 20.5 ± 0.3 | 3.3 ± 0.1 | >0.64 | >1 |
| 520f | 0.73 ± 0.03 | 23.7 ± 0.4 | 3.3 ± 0.1 | ~0.73 | ~1 |
| 550f | 0.65 ± 0.02 | 25.9 ± 0.4 | 3.3 ± 0.1 | <0.63 | ~ |

[a]: RCS is recoil compressive strength.
[b]: Number indicates heat treatment temperature in ° C.
f and t means free and tension annealing, respectively.

a: RCS is recoil compressive strength.
b: Number indicates heat treatment temperature in ° C.
f and t means free and tension annealing, respectively.

Various modifications may be made to the invention as described without departing from the spirit of the invention or the scope of the appended claims.

We claim:

1. A rod-like aromatic heterocyclic polymer having repeating units of the formula —(—Q—Ar—)$_m$—(—Q—Ph—)$_n$)— wherein Q is selected from the group consisting of

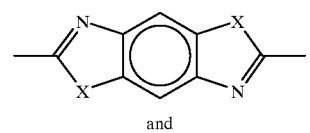

and

-continued

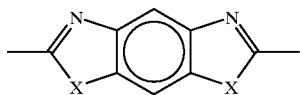

wherein X is selected from the group consisting of —O—, —S—, and —NH—; m and n are positive real numbers, each representing the fraction that the respective different recurring units are present in said repeating unit; m is 0.05 to 1.0; n is 1.0-m; Ph is 1,4-phenylene; and Ar is an ortho-alkyl pendant biphenyl having the structure

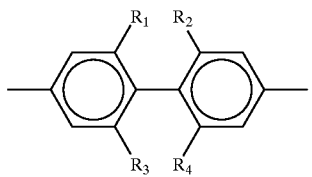

wherein $R_1$ and $R_2$ can be the same or different and are selected from the group consisting of H and $C_{1-3}$ alkyls; and $R_3$ and $R_4$ can be the same or different and are selected from the group consisting of $C_{1-3}$ alkyls.

2. A rod-like aromatic heterocyclic polymer as claimed in claim 1, wherein $R_3=R_4$ $CH_3$—.

3. A rod-like aromatic heterocyclic polymer as claimed in claim 2, wherein X is —O—.

4. A rod-like aromatic heterocyclic polymer as claimed in claim 3, wherein $R_1=R_2=CH_3$—.

5. A rod-like aromatic heterocyclic polymer as claimed in claim 3, wherein $R_1=R_2=H$.

6. A rod-like aromatic heterocyclic polymer as claimed in claim 2, wherein X is —S—.

7. A rod-like aromatic heterocyclic polymer as claimed in claim 6, wherein $R_1=R_2=CH_3$—.

8. A rod-like aromatic heterocyclic polymer as claimed in claim 6, wherein $R_1=R_2=H$.

9. A rod-like aromatic heterocyclic polymer as claimed in claim 2, wherein X is —NH—.

10. A rod-like aromatic heterocyclic polymer as claimed in claim 9, wherein $R_1=R_2=CH_3$—.

11. A rod-like aromatic heterocyclic polymer as claimed in claim 9, wherein $R_1=R_2=H$.

12. A rod-like aromatic heterocyclic polymer as claimed in claim 2, wherein m is between 0.1 and 0.3.

13. A rod-like aromatic heterocyclic polymer as claimed in claim 12, wherein m is about 0.25.

* * * * *